US008095492B2

(12) United States Patent
Cohen

(10) Patent No.: US 8,095,492 B2
(45) Date of Patent: Jan. 10, 2012

(54) METHOD AND/OR SYSTEM FOR PROVIDING AND/OR ANALYZING INFLUENCE STRATEGIES

(75) Inventor: Frederick B. Cohen, Livermore, CA (US)

(73) Assignee: frederick B. Cohen, Livermore, CA (US)

( * ) Notice: Subject to any disclaimer, the term of this patent is extended or adjusted under 35 U.S.C. 154(b) by 737 days.

(21) Appl. No.: 11/591,725

(22) Filed: Nov. 1, 2006

(65) Prior Publication Data

US 2007/0156814 A1 Jul. 5, 2007

Related U.S. Application Data

(60) Provisional application No. 60/755,238, filed on Dec. 30, 2005.

(51) Int. Cl.
*G06F 17/00* (2006.01)
*G06N 5/02* (2006.01)

(52) U.S. Cl. ........................................... 706/47; 706/45

(58) Field of Classification Search ..................... 706/47
See application file for complete search history.

(56) References Cited

U.S. PATENT DOCUMENTS

| | | | | |
|---|---|---|---|---|
| 4,803,642 | A * | 2/1989 | Muranaga | 706/53 |
| 2004/0102940 | A1 * | 5/2004 | Lendermann et al. | 703/6 |
| 2006/0106570 | A1 * | 5/2006 | Feldman | 702/179 |

OTHER PUBLICATIONS

Winston, P. "Artificial Intelligence", Addison-Wesley, 1992.*

* cited by examiner

*Primary Examiner* — Wilbert L. Starks, Jr.
*Assistant Examiner* — Li-Wu Chang
(74) *Attorney, Agent, or Firm* — Quine Intellectual Property Law Group, P.C.; Stephen J. LeBlanc

(57) ABSTRACT

A method and/or system that can be implemented on a computing device or tables or board game or otherwise uses a rule set to evaluate data about a situation and actors in order to provide advice regarding strategies for influencing actors and/or other outputs.

25 Claims, 8 Drawing Sheets
(2 of 8 Drawing Sheet(s) Filed in Color)

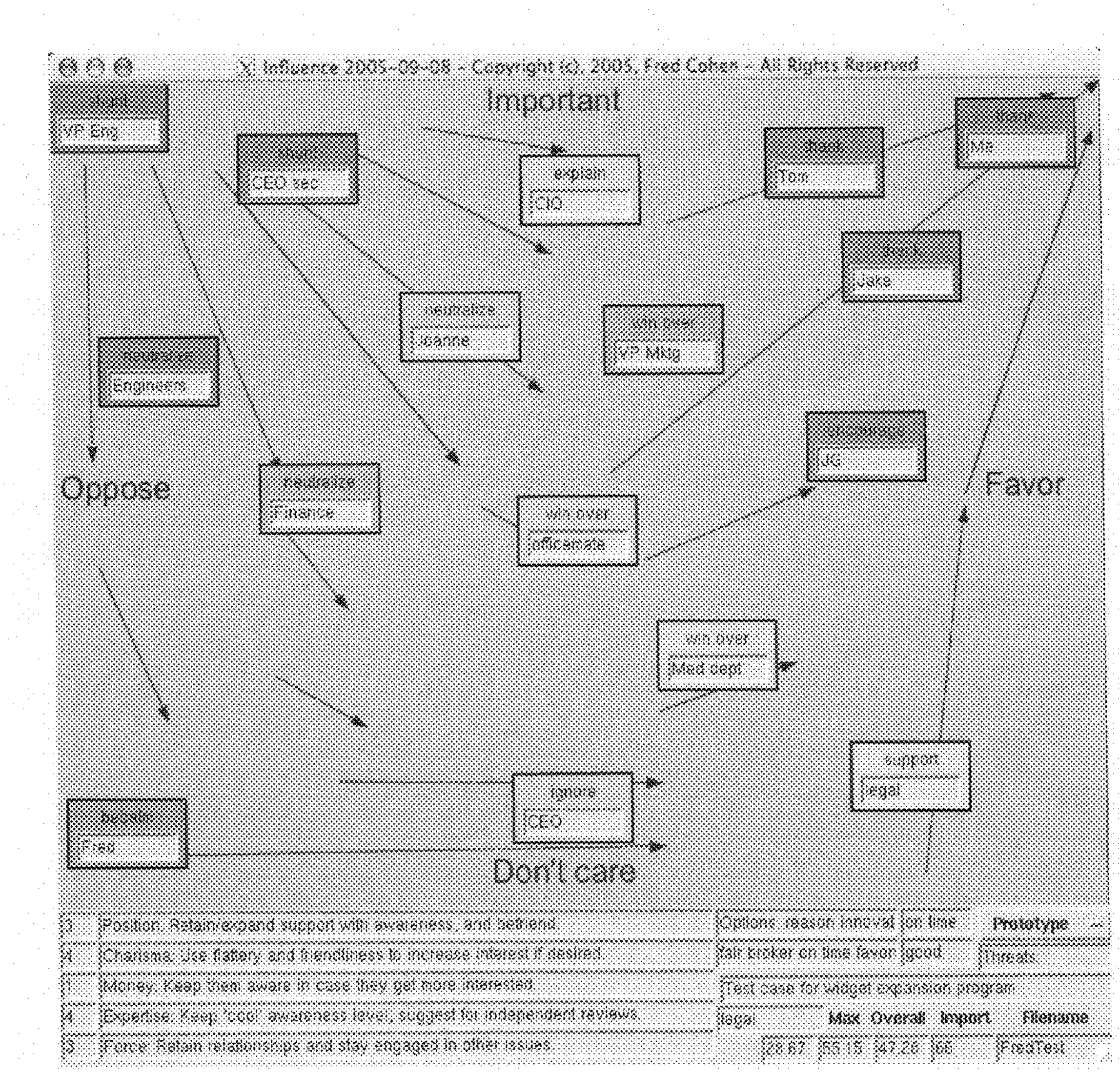
*FIG. 1B (COLOR)*

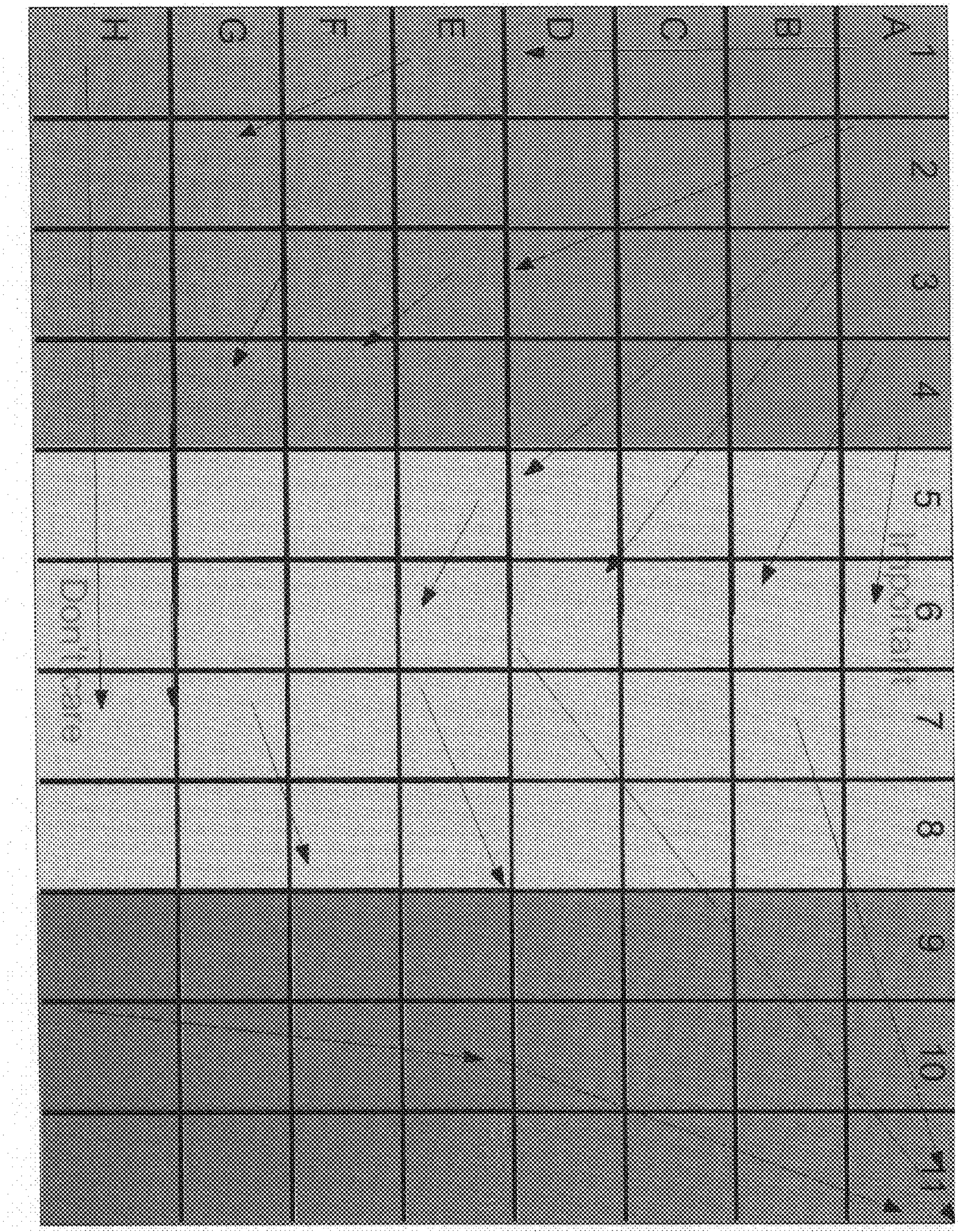
*FIG. 3B (COLOR)*

Game Score Booklet

Individual: CEO

| *Situation* | *Avoid* | *Ignore* | *Convince* | *Support* |
|---|---|---|---|---|
| [A-B][1-2] | 3 | -3 | -5 | -7 |
| [C-F][1-2] | 2 | -4 | -2 | 0 |
| [G-H][1-2] | 0 | -5 | 2 | 2 |
| [A-B][3-4] | 1 | -1 | 0 | 0 |
| [C-H][3-4] | -1 | 0 | 1 | 1 |
| [A-D][5-8] | -2 | -1 | 2 | 1 |
| [E-H][5-8] | 0 | -2 | 3 | 1 |
| [A-C][9-11] | -3 | -5 | 0 | 5 |
| [D-E][9-11] | -4 | -6 | 1 | 6 |
| [F-H][9-11] | -2 | -7 | 1 | 7 |

*FIG. 4*

Persuasion Model

Copyright © Fred Cohen

METHOD AND/OR SYSTEM FOR PROVIDING AND/OR ANALYZING INFLUENCE STRATEGIES

CROSS REFERENCE TO RELATED APPLICATIONS

This application claims priority from provisional patent application 60/755,238 filed 30 Dec. 2005 and incorporated herein by reference.

COPYRIGHT NOTICE

Illustrative embodiments of the present invention are described below. In various embodiments, the present invention may be implemented in part using program source code, using graphical interfaces, or using written tables, manuals, or other instructions. Thus, portions of material included in this submission is copyrightable and copyright is claimed by the inventor. Permission is granted to make copies of the figures, appendix, and any other copyrightable work solely in connection with the making of facsimile copies of this patent document in accordance with applicable law; all other rights are reserved, and all other reproduction, distribution, creation of derivative works based on the contents, public display, and public performance of the application or any part thereof are prohibited by the copyright laws.

APPENDIX

This application is being filed with a source code appendix on compact disc comprising example computer program source code listings according to specific embodiments of the present invention. The entire contents of this appendix is incorporated herein by reference.

APPENDIX ON COMPACT DISC

This application is being filed with or a priority application was filed with an appendix on compact disc comprising computer program source code listing according to specific embodiments of the present invention. The entire contents of this disc is incorporated herein by reference. The compact disc was created with the Windows operating system and contains the ASCII files:

| File Name | Size in Bytes | Date |
|---|---|---|
| 511-0002-10_App1.Influence.java.txt | 58,978 bytes | Oct. 31, 2006 |
| 511-0002-10_App2.Influence.java.txt | 182,929 bytes | Oct. 27, 2006 |

FIELD OF THE INVENTION

The present invention relates to methods and/or systems involving strategies for influencing actors (generally, individuals or groups) in a given situation towards a desired outcome. In specific embodiments, the invention has applications in the field of information processing methods and/or information systems and/or games and entertainments. More specifically, the present invention in various aspects is directed to methods and/or systems that provide advice and other judgments or evaluations related to the use of influence methods in social situations.

SUMMARY OF THE INVENTION

The invention in its various specific aspects and embodiments involves methods and/or systems and/or modules that provide a variety of different functions relating to influencing actors. In various embodiments, the invention provides novel methods and/or modules useful in influencing groups and individuals by applying results of social science and other research as may exist now or in the future in a systematic and practical manner so as to guide, instruct, or otherwise provide information about how to influence actors in order to achieve objectives.

According to specific embodiments, methods of the invention can include one or more of: providing advice to a user of the method for influencing individuals or groups; providing an entertaining and/or educational environment for one or more users or players to learn about methods and effectiveness of influence methods; provide entertainment relating to the influence of individuals or groups; and tracking progress in sets of efforts to influence individuals or groups over time, e.g., for the purpose of evaluating particular influence strategies, evaluating a user's performance, performing simulations, or keeping score in a entertainment or educational game setting.

In specific embodiments, the invention involves methods and/or systems and/or modules that provide a way to apply the social science results and other results as may exist now or from time to time in a systematic and practical manner so as to instruct students or entertain individuals and groups about how to influence groups in order to achieve objectives.

Tracking Progress

In specific embodiments, the invention involves methods and/or systems and/or modules that provide a way to track status and/or progress over time so as to guide, instruct, or otherwise assist individuals or groups about how to influence other individuals or groups in order to achieve objectives.

One example implementation of the invention is provided in the Source Code Appendix submitted with this specification. This example provides a logic processing system that receives as inputs information about situations and actors, in this example using a graphical user interface, and uses a rules set and a rules engine, developed from various research in the field of influencing actors as described herein to provide outputs, which in this example is primarily various pieces of textual advice such as illustrated in the figures provided herein and in the Source Code Appendix. Other optional features illustrated by example in the Appendix or included in alternative embodiments of the invention include storing of situations and data sets for later simulation or evaluation, performing a scoring function for a user or multiple users, providing means for weighting or valuing various data elements, etc.

A further understanding of the invention can be had from the detailed discussion of specific embodiments below. For purposes of clarity, this discussion may refer to devices, methods, and concepts in terms of specific examples. However, the method of the present invention may operate with a wide variety of types of devices. It is therefore intended that the invention not be limited except as provided in the attached claims.

Furthermore, it is well known in the art that logic or software systems or systematized methods can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in the specification, and the invention should not be limited except as provided in the embodiments described in the attached claims.

Various aspects of the present invention are described and illustrated in terms of graphical interfaces and/or displays that user will use in working with the systems and methods according to the invention. The invention encompasses the general software steps that will be understood to those of skill in the art as underlying and supporting the functional prompts and results illustrated.

All publications cited herein are hereby incorporated by reference in their entirety for all purposes. The invention will be better understood with reference to the following drawings and detailed description.

The discussion of any work, publications, sales, or activity anywhere in this submission, including any documents submitted with this application, shall not be taken as an admission that any such work constitutes prior art. The discussion of any activity, work, or publication herein is not an admission that such activity, work, or publication existed or was known in any prior jurisdiction.

BRIEF DESCRIPTION OF THE DRAWINGS

The file of this patent contains a least one drawing executed in color. Copies of this patent with color drawings will be provided by the United States Patent and Trademark Office upon request and payment of the necessary fee.

FIG. 4 illustrates an example of a score table according to specific embodiments of the invention.

DESCRIPTION OF SPECIFIC EMBODIMENTS

Overview of Social Research Regarding Influence

Figure 1A:
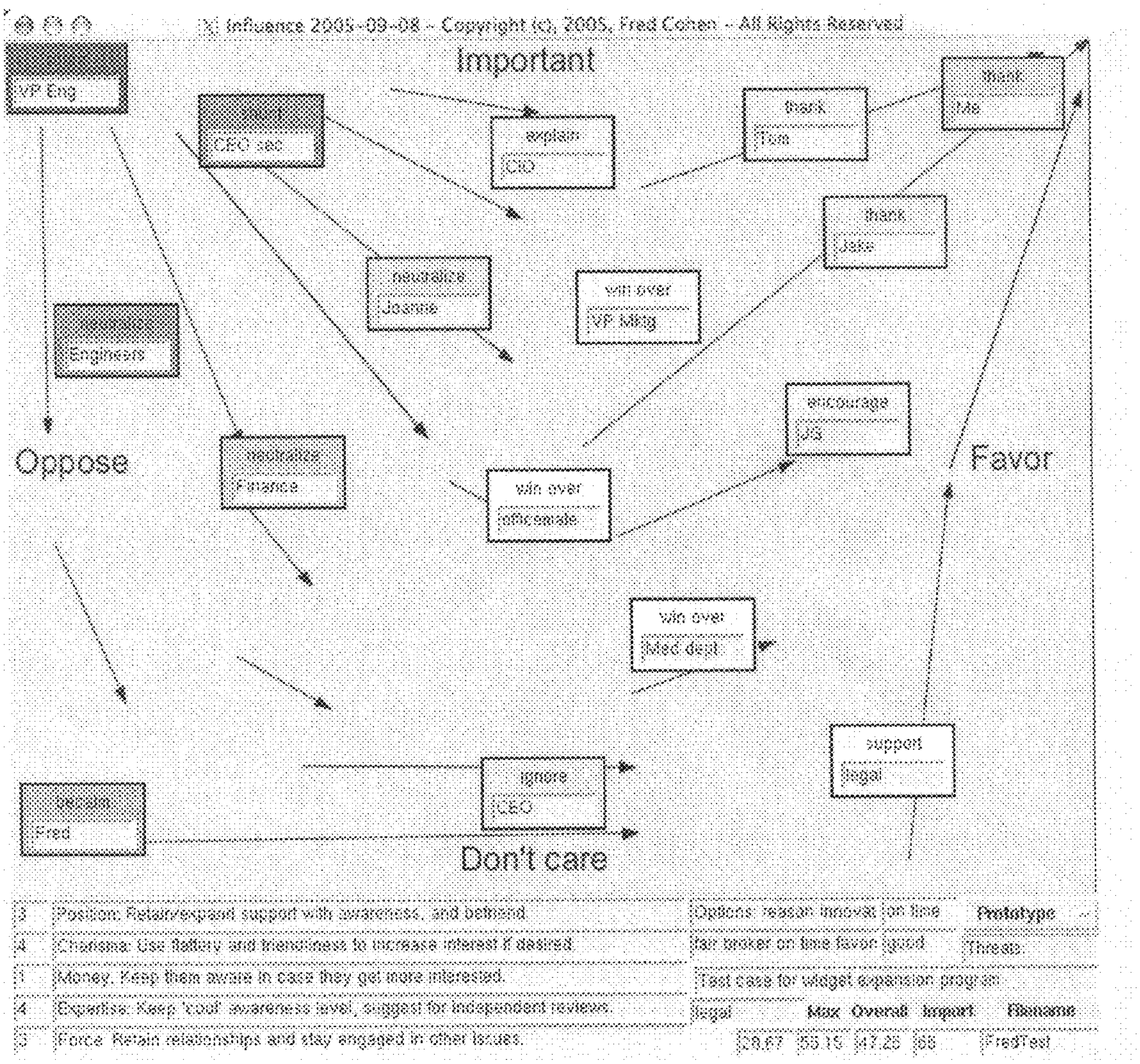
FIG. 1 illustrates a screenshot of an example graphical interface with interactive actor objects and data input and advice presentation and data output fields allowing influence related data to be input and presented interactively according to specific embodiments of the present invention.

Many authors and researchers have examined various facets related to influencing a human organization from experiential and cognitive perspectives. While these studies and in some cases practical applications thereof have been described in both scholarly and popular literature, there has been no method or system developed that the inventor is aware of for practically applying the results of such studies to simple or complex real-world situations or educational or entertainment simulations.

Chuck Whitlock

For example, Chuck Whitlock has done extensive work identifying and demonstrating deceptive influences. [1] His book includes detailed descriptions and examples of many common street deceptions. Fay Faron points out that most such confidence efforts are carried out as specific 'plays' and details the anatomy of a 'con' [2]. She provides seven ingredients for a con (too good to be true, nothing to lose, out of their element, limited time offer, references, pack mentality, and no consequence to actions). The anatomy of the confidence game is said to involve (1) a motivation (e.g., greed), (2) the come-on (e.g., opportunity to get rich), (3) the shill (e.g., a supposedly independent third party), (4) the swap (e.g., take the victim's money while making them think they have it), (5) the stress (e.g., time pressure), and (6) the block (e.g., a reason the victim will not report the crime). Her work includes a 10-step play that makes up the big con.

Bob Fellows

Bob Fellows [3] examines how 'magic' and similar techniques exploit human fallibility and cognitive limits to deceive people. According to Bob Fellows [3] (p 14) the following characteristics improve the chances of being fooled: (1) under stress, (2) naivety, (3) in life transitions, (4) unfulfilled desire for spiritual meaning, (5) tend toward dependency, (6) attracted to trance-like states of mind, (7) unassertive, (8) unaware of how groups can manipulate people, (9) gullible, (10) have had a recent traumatic experience, (11) want simple answers to complex questions, (12) unaware of how the mind and body affect each other, (13) idealistic, (14) lack critical thinking skills, (15) disillusioned with the world or their culture, and (16) lack knowledge of deception methods.

Fellows also identifies a set of methods used to manipulate people. The illusion of free choice is an example where the victim has choice but no matter what choice is made, as long as it fits the constraints of the person carrying out the deception, the victim will appear to have had their mind read. This is an example of a posteriori proof. The deception involves a different path to the desired solution depending on the solution required by the 'free choice' of the victim. Mind control is exerted through social influence that restricts freedom of choice. It consists of psychological manipulation, deception, and the use of 'demand characteristics'. Demand characteristics are based on social conditioning that put pressure on the individual to act in predictable ways in properly constrained situations. For example, in a stage trick, when you ask the person to make a choice between one of two things, they are socially constrained not to choose a third option. A theater setting causes people to sit and listen while a speaker talks. Guests generally try not to complain, so by treating people as guests, a person is more likely to influence them to sit and listen to that person's political views. Hypnosis, suggestion, absorption, fatigue, and social influence are also identified as control methods. In hypnosis, a hypnotic state is induced, while in suggestion uncritical acceptance and sometimes response to an idea is involved, while in absorption, the individual's attention is focused on an activity so that it is hard to distract them from it.

In his examination of manipulation techniques, Fellows includes: (1) vague or tailored standard of success, (2) observation of human nature, (3) situational observation, (4) specific vs. ambiguous information, (5) information control, (6) pseudo-scientific or spiritual theories, (7) confusing normal experiences with extrasensory perception, (8) skeptical stance, (9) fishing (deception), (10) authority, charisma, and appearance, (11) misdirection, (12) humor, (13) limited paranormal claims, (14) mind body connection demonstrations, (15) selective subject responsibility, (16) probability, (17) individual tailoring, (18) dissonance reduction and self-perception, (19) compliance and suggestibility, (20) shaping behavior, and (21) selective perception and recall. These are combined in a script to make a convincing case to an audience.

Thomas Gilovich

Thomas Gilovich [4] provides in-depth analysis of human reasoning fallibility by presenting evidence from psychological studies that demonstrate a number of human reasoning mechanisms resulting in erroneous conclusions. This includes the general notions that people (erroneously) (1) believe that effects should resemble their causes, (2) misperceive random events, (3) misinterpret incomplete or unrepresentative data, (4) form biased evaluations of ambiguous and inconsistent data, (5) have motivational determinants of belief, (6) bias second hand information, and (7) have exaggerated impressions of social support.

The table below illustrates examples of specific common syndromes and circumstances associated with them. These mechanisms are detailed and supported by substantial evidence and most of them are believed to be common to most individuals in all human societies.

| Mechanism | Example |
|---|---|
| (0) Effects should resemble their causes, | |
| (0a) Instances should resemble their categories | Similar looking animals must be more closely related genetically than different looking ones. |
| (0b) Like resembles like | Measles come from germs with spotted coatings. |
| (0.5) Tendency toward oversimplification, | |
| (0.5a) Occam's Razor | When a simple explanation will do, choose it over the more complicated one. |
| (0.5b) Black and White | Tends to be preferred over shades of gray. |
| (0.5b) Rule of 3s | Lists of three things are better accepted in some cultures. |
| (1) the misperception of random events, | |
| (1a) the clustering illusion, | Events appear to be correlated even when they are not correlated |
| (1b) over application of representativeness, | The 'law of small numbers' - a few examples are taken as more significant than they really are. |
| (1c) misperceptions of random dispersions, | Various random events are seen as 'shooting streaks' because randomness is not well understood by most observers. |
| (1d) the creation of causal theories, | People have a tendency to create theories to explain what they see and adopt them regardless of evidence. |
| (1e) the regression fallacy, | People underestimate the effect of regression. For example, if you usually average two sales a day and make five sales for each of three days in a row, people will think you are in a slump when you only make one or two sales a day for the next week. |
| (2) misinterpretation of incomplete or unrepresentative data, | |
| (2a) the excessive impact of confirmatory information, | A small number of confirmations are treated as proof, while an occasional refutation may be dismissed as invalid for some a posteriori reason (perhaps generated 1d above). |
| (2b) the tendency to seek confirmatory data, | If you are looking for red in fires you will tend to count orange as red, and not discount the presence of blue along with red. |
| (2c) the problem of hidden or absent data, | If you justify the quality of your hiring process by tracking only the success rates of people you hire, you are ignoring the missing data on how successful the people you didn't hire might have been. |
| (2d) self-fulfilling prophecies, | If people believe the markets are crashing, they will pull their money out, and thus the markets will crash. |
| (3) the biased evaluation of ambiguous and inconsistent data, | |
| (3a) ambiguous information is interpreted in context, | We tend to interpret ambiguous data in the context of what we are looking for. |
| (3b) unambiguous data is shaded, | An explanation for the invalidity of data that is inconsistent with theories is often found. |
| (3c) multiple endpoints, | If the data is ambiguous we will tend to associate it with our expectations for outcomes, thus biasing the result. For example, some element of a baby's face looks like anyone and will be associated with the parents face even if the child is adopted. |
| (3d) confirmations and non-confirmations, | Non confirmations are often ignored rather than treated as refutations. Selective memory is an example where people will tend to remember predictions that come true over time and forget those that do not come true. |
| (3e) focused and unfocused expectations, | If we believe that bad things come together in threes but don't set a time limit on what it is to come together, we will wait till the count hits three and declare that we were right. If we are trying to associate a dream of a sunny day with events of the day, we will find the moment that the sun broke through the clouds as a confirmation. |
| (3f) outcome asymmetries and one-sided events, | |
| (3f-i) hedonic asymmetries, | There is a tendency to overemphasize things that are more striking to us. For example, it may seem like you almost always get splashed by a passing car on wet days, when in fact you just remember being splashed more than not being splashed. |
| (3f-ii) pattern asymmetries, | You remember when you wake up and see 1:11 or 2:22 on the clock better than when you see 1:52 or 2:17 |
| (3f-iii) definitional asymmetries, | Things won't get better till you have hit rock bottom - but since 'rock bottom' is not pre-defined, it is always able to be true since we can call wherever you turned around, 'rock bottom. |

-continued

| Mechanism | Example |
|---|---|
| (3f-iv) base rate departures, | "Thinking about being healthy will help you cure cancer" is supported by people who have thought about being healthy and survived, but it ignores the people who thought about being healthy and died, because they are not available as data points. |
| | (4) motivational determinants of belief, |
| (4a) empirical support for the wish to believe, | After the Nixon/Kennedy debates, supporters for each side thought their side had one. They interpreted the same thing in different ways. |
| (4b) mechanisms of self-serving beliefs, | If you want to believe it you ask "Can I believe it" while if you don't want to believe it you ask "Must I believe it". |
| (4c) optimistic self-assessment | The vast majority of people believe they are above average in intelligence and beauty. |
| | (5) the biasing effect of second hand information |
| (5a) sharpening and leveling, | In relaying situational information, descriptions of peoples' behavior tends to be 'sharpened' or emphasized, while descriptions of their surroundings tend to be 'leveled' or de-emphasized. |
| (5b) the corrupting effect of increasingly indirect evidence, | The game of 'telephone' is a great example. |
| (5c) telling a good story, | In order to make the story interesting to the audience, distortions are often introduced. The 'historical movies' that come out of Hollywood are examples of how telling a good story often distorts facts in favor of 'flavor'. |
| (5d) distortions in the name of informativeness, | Stories are often told with exaggerations of the fact to make a point. A little girl down the block did than and she was never seen again . . . |
| (5e) distortions in the name of entertainment, | 'There is one example of . . . ' becomes 'I had a friend who . . . ' and the audience misinterprets it as if their own friends probably . . . Inquiring minds want to know . . . The media is notorious for this. |
| (5f) distortions in the name of self interest, | Look at the statements of political parties. |
| (5g) distortions due to plausibility, | So-called urban legends are good examples of this - for example the non-existent U.S. patent agent who supposedly resigned because he thought that nothing else could be invented. |
| | (6) exaggerated impressions of social support, |
| (6a) social projection and the false consensus effect, | Most people think that most other people agree with them about their views on things. |
| (6b) inadequate feedback from others. | People may agree out of politeness or not indicate that they disagree because of a desire not to offend. Children show less of this than adults. |

Charles West

Charles K. West describes the steps in psychological and social distortion of information and provides detailed support for cognitive limits leading to deception. Distortion comes from the fact of an unlimited number of problems and events in reality, while human sensation can only sense certain types of events in limited ways: (1) A person can only perceive a limited number of those events at any moment (2) A person's knowledge and emotions partially determine which of the events are noted and interpretations are made in terms of knowledge and emotion (3) Intentional bias occurs as a person consciously selects what will be communicated to others, and (4) the receiver of information provided by others will have the same set of interpretations and sensory limitations.

| Step | Details | Subtypes |
|---|---|---|
| A | An unlimited number of problems and events in reality. | The whole universe and all of the various effects of the wave equations at every scale. All of physics effects us. |
| B | Human sensation can only sense certain types of events in limited ways. | This includes Hearing, Sight, Smell, Touch, and Taste - the so-called five senses. |
| B.1 | Hearing | Hearing is limited in frequency range, resolution, and discrimination. |
| B.2 | Sight | Sight is limited in frequency range, resolution, and discrimination. |
| B.3 | Smell | Smell is limited in chemical combinations and discrimination. |
| B.4 | Touch | Touch is limited in sensitivity, sensor distribution, and pressure differentiation. |
| B.5 | Taste | Taste is limited in chemical combinations and discrimination. |
| C | A person can only perceive a limited number of events from B at any moment. | There are three ways in which the nerve system limits the transmission of sensory impulses to the brain; habituation, inhibition, and Hernandez Peon effects. |
| C.1 | Habituation | Habituation tends toward ignoring repeated senses. |
| C.2 | Inhibition | Inhibition limits the effect of other sensors proximate to a high firing rate sensor. |
| C.3 | Hernandez Peon effects | Hernandez Peon effects limit the ability to use one sense when focusing on another sense. |
| D1 | A person's knowledge and emotions partially determine which of the events in C are noted. | Frame of reference and experience drives the sequence of focus. This includes concepts, structures, affects, needs, |

-continued

| Step | Details | Subtypes |
|---|---|---|
| | Interpretations of C are made in terms of knowledge and emotion. | values, and interests. |
| D1.1 | Thought: Concepts | Awareness combined with meaning or significance. For example, when a set of words are presented to test subjects before performing a complex task, if some of the words presented in order might help solve the task, the subjects are more likely to do a better job of solving the task sooner. They have somehow mapped the words into a concept allowing a more rapid and more effective solution. |
| D1.2 | Thought: Structures | Conventions and standard ways of going about things. A very good example is that when shown the same ambiguous stimulus, people from different cultures will see different objects. Similarly, when presented with audio gibberish in repeated patterns, people will hear different word sequences and those sequences will change with time. Similarly, when structures exceed memory capacity, people create organization schemes to allow them to be remembered (7 +/− 2). |
| D1.3 | Feeling: Affects | Likes, dislikes, happiness, sadness, afraid, etc. states of mind effect ability to recognize words, etc. |
| D1.4 | Feeling: Values | Fairness, right and wrong lead to changes in attitude and acceptance of new information. |
| D1.5 | Feeling: Needs | Lack of food, water, sugars, air, etc. lead to reduced learning capacity, increased association of sensory data to need-related information. |
| D1.6 | Feeling: Interests | More interest leads to better learning. |
| D2 | A person's perceptions of C may also be influenced by group norms and social pressure. | Frame of reference and experience drives the sequence of focus. This includes |
| D2.1 | Reinforcement | The group sets punishments and rewards. Authority and percentage and size of group agreeing, while education and high ethics reduces conformance. |
| D2.2 | Imitation | There are rewards for perceiving and acting like the group and punishment for not seeing and acting like the group. You might learn what to do (initiating) or learn what not to do (inhibiting). |
| E | Intentional bias as a person consciously selects from D1 and D2 that which will be communicated to others. | This is also known as lying. |
| F | The receiver of information provided by others will return to step C and all other steps may be repeated | Thus more distortion results from the inadequacy of language to describe reality, the incommensurability of experience between people, and the distortions of language bias. |

Chester Karrass

Figure 6:
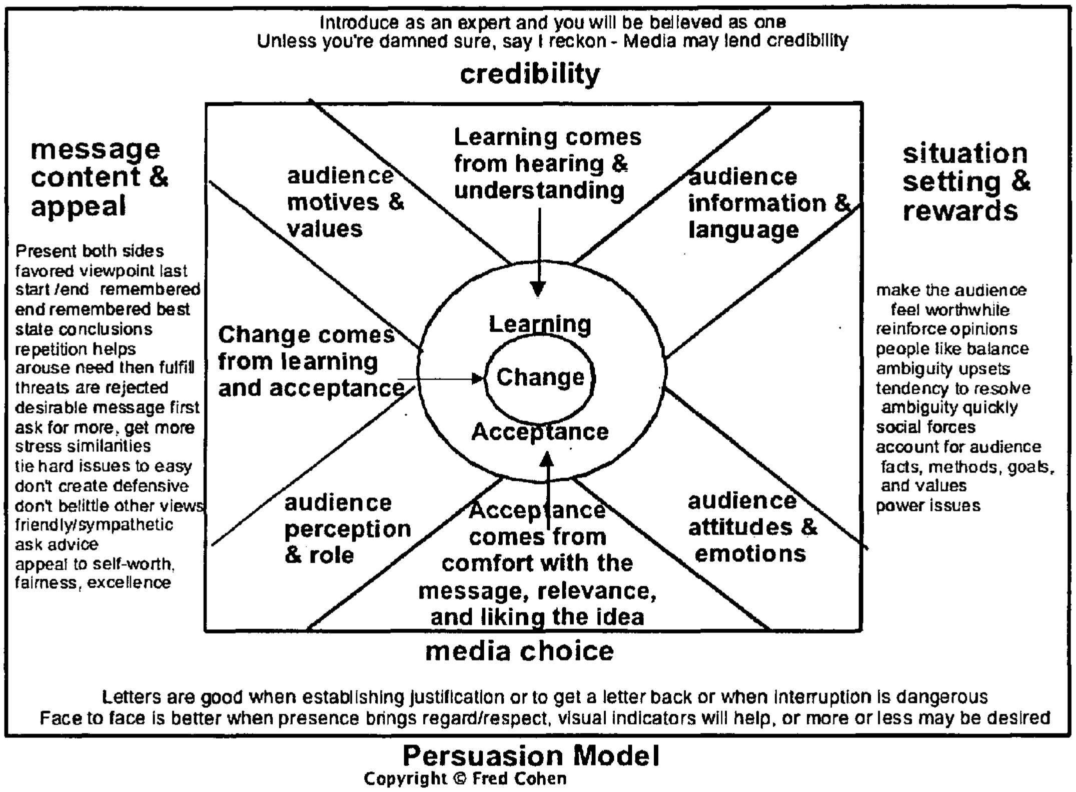
FIG. 6 is a chart illustrating a learning and acceptance model that can be incorporated according to specific embodiments of the invention.

Karrass [7] provided summaries of negotiation strategies and the use of influence to gain advantage. He also explain how to defend against influence tactics. He identified (1) credibility of the presenter, (2) message content and appeal, (3) situation setting and rewards, and (4) media choice for messages as critical components of persuasion. He also identifies goals, needs, and perceptions as three dimensions of persuasion and lists scores of tactics categorized into types including (1) timing, (2) inspection, (3) authority, (4) association, (5) amount, (6) brotherhood, and (7) detour. Karrass also provides a list of negotiating techniques including: (1) agendas, (2) questions, (3) statements, (4) concessions, (5) commitments, (6) moves, (7) threats, (8) promises, (9) recess, (10) delays, (11) deadlock, (12) focal points, (13) standards, (14) secrecy measures, (15) nonverbal communications, (16) media choices, (17) listening, (18) caucus, (19) formal and informal memorandum, (20) informal discussions, (21) trial balloons and leaks, (22) hostility relievers, (23) temporary intermediaries, (24) location of negotiation, and (25) technique of time. FIG. 6 is a chart illustrating a learning and acceptance model that can be incorporated according to specific embodiments of the invention.

Karrass explains that change comes from learning and acceptance. Learning comes from hearing and understanding, while acceptance comes from comfort with the message, relevance, and good feelings toward the underlying idea. These are both affected by audience motives and values, the information and language used for presentation, audience attitudes and emotions, and the audience's perception and role in the negotiation. By controlling these factors, advantages can be gained in negotiations.

Additional factors include:

(1) Credibility of the presenter helps gain advantage and it attained by suitable introduction and historical behavior;

(2) Message content and appeal are gained by (a) presenting both sides with the favored viewpoint at the start and end, (b) repetition of the points to be made, (c) stating conclusions, (d) arousing a need and then fulfilling it, (e) avoiding threats, which tend to be rejected (f) asking for more, which tends to get you more, (g) stressing similarities, (h) tying hard issues to easier ones, (i) not creating defensive situations, (j) not belittling other views, (k) being friendly and sympathetic, (l) asking for advice, and (m) appealing to self worth, fairness, and excellence;

(3) Situation setting and rewards also play important factors and can be enhanced by (a) making the audience feel worthwhile, (b) reinforcing pre-existing opinions, (c) presenting a balance of ideas, (d) avoiding or offering to remove ambiguity, (e) using social pressures to your advantage, (f) accounting for audience facts, methods, goals, and values, and (g) understanding and dealing with issues of power and influence.

(4) Media choice for messages can also be important. (a) Letters are good when establishing justification, for getting letters back, for establishing justification, and when interruption is dangerous, (b) face to face is better when personal presence brings regard or respect, when visual indicators will help, or when more or less information may be desirable. (Karrass was writing before FAXes and Email were widely available).

Karrass provides a three dimensional depiction of goals, needs, and perceptions and asserts that people are predictable. The three dimensions he identified are:

Goals: (1) money, (2) power and competence, (3) knowledge, (4) achievement, (5) excitement and curiosity, (6) social, (7) recognition and status, (8) security and risk avoidance, and (9) congruence.

Needs: Maslow's Needs Hierarchy includes (1) basic survival, (2) safety, (3) love, (4) self worth, and (5) self-actualization.

Perception: Perception of goals include: (1) how do you want opponents to see you, (2) how do opponents see their goals, (3) how do you see opponent goals, (4) how do you want opponents to see your goals, (5) how do you think opponents see your goals, and (6) how do you see your goals.

The object of a successful negotiation is to optimize how everyone sees their goals. Karrass also lists a series of specific negotiation techniques and countermeasures, and his work has been widely hailed as seminal in the field. Millions of people have now been exposed to his work. Some of the specific tactics he describes include:

| Type | Tactic | Description | Effect | Countermeasure |
|---|---|---|---|---|
| Timing | Patience | Willing to bear with the situation for as long as it takes. | Lowers expectations of rapid progress, may cause a desire to yield more rapidly to make progress. | More patience, loss of value with time, increased social pressures. |
| Timing | Deadline | Time limits on completion of the negotiation may drive to concessions. Many times the one with more time goes by the other parties' deadline, thus making it harder to 'win'. | Whoever has longest can take advantage. | Don't reveal deadlines, or set other parameters to limit negotiation points. |
| Timing | Speed | Quick agreements can be made on small points, one after another, until there are no points left to be agreed upon. | Causes a pattern of saying yes which carries through to future issues that may not have yielded a yes and creates an expectation of rate of progress. | Quick counteroffers, refusal to make partial agreements, or a slowing of the process. |
| Timing | Fait accompli | Actions that alter the balance of bargaining power by virtue of already being in place, thus making them far harder to undo. | Reduces expectations, increases work to change things. | Tit-for-tat reprisals, demonstration of willingness to undo what seems nearly impossible to undo. |
| Timing | Surprise | New conditions or requirements are added after part of the negotiation is completed. | Lowers expectations and changes the value of previous sub-agreements. | Changes require restart of the whole negotiation process, make similar changes to previous positions, make unrelated changes that gain back whatever is lost. |
| Timing | Status quo | Go with the same agreement we had before unless and until the new agreement is completed. | Lower expectations for new agreement, bypass deadlines. | Go on strike, indicate that the deadline ends the old agreement, go with the old agreement with an 'adjustment' for changes in condition (cost of living increase is an example). |
| Timing | Stretchout | Deliberate extension of negotiation over a long time. | Force the opponent to expend resources, create internal friction, increase pressure for agreement. | Walk away, start taking desirable issues off the bargaining table, start increasing the price, other time dependent reduction in opponent expectations. |
| Inspection | Open inspection | Unlimited inspection is permitted. | Openness, honesty, nothing to hide. | Do inspections and verify it. |
| Inspection | Limited inspection | Access for inspection is limited at the control of the party being inspected. | We are open, but we won't let you look around forever before making progress. | If limited inspections are inadequate, so indicate. |
| Inspection | Confession | Full disclosure of all known items of interest are made. | Openness and honesty is laudable. | None needed except verification. |
| Inspection | Qualified confession | Questions are answered but faults are not offered. | Appearance of openness but information is only selectively revealed as needed. | Ask a lot of questions, including general ones like 'Are there any other things that might be relevant . . . " |
| Inspection | Third party | Access by agreed upon neutral third parties. | We are open and honest, but we have legitimate reasons for limiting your access. | Question sincerity, find a good inspector. |
| Inspection | No admittance | No inspection is permitted. | Reduction of expectations/can be used to cause mystique. | Go elsewhere, require alternatives to inspections. |
| Authority | Limited authority | The person at the table is not authorized to make the final deal. | It allows negotiation toward the best we can get from you, followed by having to get more | If authority is know ahead of time, provide a non-authoritative negotiator on your side. If this is revealed after |

-continued

| Type | Tactic | Description | Effect | Countermeasure |
|---|---|---|---|---|
| | | | from you. | negotiations are underway, treat as a possible deception. |
| Authority | Approval | The person at the table can negotiate, but the deal requires approval. | Lowers expectations of finality, creates potential for refusal to approve, allows negotiator to 'blame' on someone else, allows negotiator to act like they are on your side. | Seek approval at every step, negotiate in good faith to a final agreement and refuse to take less, indicate that you too need approval and get their approval first. |
| Authority | Escalation approval | Deliberate creation of additional approvals. | Lowers expectations, an escalation of the items in "Approval". | As in "Approval". |
| Authority | Missing man | Deliberate absence of person with final authority. | As in "Approval" | As in "Approval" or indicate that you will be willing to reschedule for when the final authority is available. |
| Authority | Arbitration | Third party decision - neutral or biased. | Create at least the illusion of impartiality and fairness, lays blame on others. | Refuse to permit it, accept a well known mechanism, accept only really trusted third parties, back out. |
| Association | Alliances | Strong partners | Strengthen bargaining power, strong desire for mutual benevolence. | Foster this. |
| Association | Associates | Friends | Slight strengthening of bargaining power. desire for mutual benevolence. | Foster and improve this, ask for references. |
| Association | Disassociates | Mutual non-friends | The enemy of my enemy is my friend. | Use caution - it is not always true. |
| Association | United Nations | Broad-based alliance of industry members. | Strength in numbers. | Try to use it to improve ties, gain reference information. |
| Association | Bribery | Payoff and collusion | Someone pays someone for an advantage. | Report to law enforcement, report to management, refuse to deal with them, take their money (legally only - give them a receipt and fair market value) and don't weaken your position. |
| Amount | Fair and reasonable | Everyone wants to believe they are fair and reasonable. | Appeal to morality and sense of fairness. | Get select examples of competitors and raise price to meet theirs, provide explanations for why yours is fair and reasonable at a higher price. |
| Amount | Bulwarism | Take it or leave it. | Expectations are forced toward win or lose - no shades of gray. | Leave it. |
| Amount | Nibbling | Take small concessions one after another - after other issues are settled. | Many seemingly small items come out to a large difference. | Nibble back. For every nibble, extract a price. |
| Amount | Budget bogey | My budget is only so much. | Puts artificial limits on price. | Offer lower-quality alternatives that meet the budget, help them increase the budget, spread over multiple budget items or cycles. |
| Amount | Blackmail | Since you have no choice, they can ask whatever they want - up to a limit. | Investment in this line leaves you with little choice. | Change directions, nibble for other concessions, change other terms, walk away. |
| Amount | Escalation | After agreement, take your part and raise demands. | Lowers expectations and feelings of self-worth | Return fire - don't let them get away with it - Offer accepted is a legal contract - etc. |
| Amount | Intersection | Tie together otherwise separate negotiations. | Creates complexity and opportunity for tying easy things to hard ones. | Refuse to tie, tie still other items, deal with the increased complexity, etc. |
| Amount | Non-negotiable | Select items can not be altered. | Lowers expectations with respect to those items and creates automatic wins for one side. | Don't buy into it, create your own non-negotiables, negotiate harder for other items, walk away. |
| Amount | Chinese auction | Multiple opponents are played off against each other. | Creates competition between competitors. | Ignore the others and negotiate for yourself, walk away, explain that after they have their best offer elsewhere, if they want to deal with you, you will be available to discuss it, trade price for other terms. |
| Brotherhood | Equal brothers | Based on equal status. | Expectation of tit for tat. | Fulfill expectation with appropriate caution. |

-continued

| Type | Tactic | Description | Effect | Countermeasure |
|---|---|---|---|---|
| Brotherhood | Big Brother | Benevolence based on higher status. | Since I am so much bigger I will help you. | Thanks, I could use the help. |
| Brotherhood | Little brother | Charity desired based on lower status. | I am small and you are big, please be nice. | Recognize that they are potentially exploiting your desire to be good. |
| Brotherhood | Long-lost brothers | Search for relationship and status. | Trying to find common ground. | Provide it. |
| Brotherhood | Brinkmanship | Intersecting destiny based on high joint risk. | Threat-based and potentially very dangerous. | Decide if it is worth it and if so expect serious consequences and prepare for them. |
| Detour | Decoy | Attract or snare | Seemingly excellent offer is used to get you to invest time and effort which you are then motivated to get value for. | Recognize and walk away, negotiate harder to get back full value, set parameters and expectations appropriately so that you are not snared. |
| Detour | Denial | Negation or retraction of statement. | Create false impressions, generate concessions to indicate real parameters, lower expectations, increase anger and frustration, create delays. | On the first time, indicate displeasure, and take back all of the previous discussions, create pressure on their side to stop it. |
| Detour | Withdrawal | Walk away from negotiations. | Lowers expectations, may generate wild concessions just to get you back to the table. | Don't give in, create social pressures to bring them back, seek out alternative deals. |
| Detour | Good and bad guys | Good cop bad cop. | You confide in the friendly one, who looks good in comparison to the unfriendly one. | Recognize the tactic and don't be offended or fooled by it. |
| Detour | False statistics an errors | Creating deceptive statistics | The statistics have the appearance of authority. | Question, understand, and verify this sort of information. |
| Detour | Scrambled eggs | Creating deliberate confusion on issues or figures | Confusion is used to cause the negotiator to make mistakes and get in over their head. | Know when you don't know enough and ask for help, bring in experts, explain that it is getting too complex and that if it isn't simplified, you will have to seek alternatives. |
| Detour | Low balling | Initial low price with high add-ons (close to bait and switch) | Create expectation of low price and momentum to buy, followed by seemingly small adjustments that add up. | Try to get the add-ons for free, nibble at the add-ons, get the 'whole' price and then compare it to alternatives. |
| Detour | Scoundrel | Larceny by never-ending negotiations | Wastes time and effort while consuming your resources. | Detect and walk away. |

Karrass also provides a list of negotiating techniques including: (1) agendas, (2) questions, (3) statements, (4) concessions, (5) commitments, (6) moves, (7) threats, (8) promises, (9) recess, (10) delays, (11) deadlock, (12) focal points, (13) standards, (14) secrecy measures, (15) nonverbal communications, (16) media choices, (17) listening, (18) caucus, (19) formal and informal memorandum, (20) informal discussions, (21) trial balloons and leaks, (22) hostility relievers, (23) temporary intermediaries, (24) location of negotiation, and (25) technique of time.

Cialdini

Cialdini [8] provides a simple structure for influence and asserts that much of the effect of influence techniques is built-in below the conscious level of most people. Some factors cross all human societies, while others may be more affected by social norms and culture. Cialdini discusses both the benefits of these natural tendencies and their exploitation by professionals for gaining compliance to desired behaviors. Regardless of how they are created, these techniques are apparently pattern matching phenomena that operate without regard to deep logical thought processes:

| Area | Technique | Explanation |
|---|---|---|
| Reciprocation | If it costs more it is worth more | Raising the price on many items increases their sales because the buyers are looking for high quality and associate it with price. |
| Authority | Experts know more than others | When someone believes you are an expert, they will tend to defer to your opinions regardless of the sensibility of those opinions. |
| Contrast | Contrast principle | Substantial differences tend to be exaggerated. Things are taken relative to context. After having your hand in hot water, luke-warm water seems cool. To sell something expensive, start by offering something more expensive and work your way down. |

-continued

| Area | Technique | Explanation |
|---|---|---|
| Automaticity | Because | When you add a 'because' followed by no new information, the chances of compliance increase substantially. |
| Reciprocation | Reciprocation | People tend to reciprocate any gifts. For example, even a meaningless gift will create an obligation. Refusal to accept a return gift makes you less likable because of the lack of opportunity to reciprocate. |
| Reciprocation and Contrast | Reject and retreat | This invokes both reciprocation and contrast. You start by asking for something big, then lower the request to something smaller. By reducing your request, you are both giving a concession (reciprocation leading them to offer you something) and by lowering from a higher value you are invoking contrast (the second request doesn't look as high next to the first one). |
| Commitment and Consistency | Commitments are honored | If you can generate a promise of some sort, there will be a strong desire to fulfill it - no matter how much effort it takes or under what circumstances the promise was given. |
| Commitment and Consistency | Consistency is highly valued | Once you commit, your interpretation of inputs tend to support that committed view. |
| Automaticity | Desire not to think | If it requires thinking and they can back down to a simple rule of behavior, they will try to do so. |
| Automaticity | Strong desire not to rethink | If it requires rethinking, it introduces self-doubt and will be avoided unless absolutely necessary. |
| Automaticity | Default decision process | Logic is only used if there is a desire and ability to analyze the situation, otherwise, pattern matching to known social behavioral patterns is used. |
| Commitment and Consistency | Small commitments lead to big ones | Self-image is raised through making and keeping to commitments and as a result, larger and larger commitments are made over time. |
| Commitment and Consistency | Active commitments are better than passive ones | Commitments where you do something are far more effective at gaining subsequent compliance than those which are passive promises. |
| Commitment and Consistency | Public image leads to self image | Written statements are given more credence than oral ones - both by author and reader, there is a higher tendency to do something if you write it down, public commitments are more often kept than private ones. |
| Commitment and Consistency | Increased compliance with investment | Invested time and effort (sunk costs) forms increased commitment; more pain involved increases commitment level (loyalty from hazing, more pain more gain), less external return forces more internalization of value (ownership and commitment follow), low-balling works (get a commitment, create other supports for the decision, then remove the original motivation and the commitment remains). |
| Commitment and Consistency | Consistency causes decisions | Even when remaining consistent seems foolish, people will choose new reasons to stay with a decision because to do otherwise would cause you to have to admit you were wrong and rethink your previous commitments. |
| Social Proof | We interpret based on how others interpret | Laugh tracks work even if we know they are in use. Seeded collection boxes cause increased donations. Popularity is taken as goodness, even if known to be wrong. |
| Social Proof | Social proof replaces hard proof in uncertainty | Fear is reduced by watching others like you not fear it. Create uncertainty and generate social proof. Social proof works better when they are like you. |
| Liking | We like saying 'yes' to people we like | Twice as likely to say yet to people we like, referrals from friends increase likelihood of success in sales, MCI 'friends and family' is 90% effective because it 'does a friend a favor' to switch. |
| Liking | Physical attraction increases liking | We are more likely to like someone we are physically attracted to and likely to dislike someone we are not physically attracted to. |
| Liking | Similarity breeds liking | Similar dress, color, background, behaviors, accents, lifestyle, interest, age, religion, politics, and names are all examples of how similarities increase liking and differences decrease liking, even when known to be falsehoods. |
| Liking | Compliments increase liking | Even when compliments are known to be deceptions, people still like those who give them - unless they go 'too far'. |
| Liking | More contact increases liking | Familiarity improves liking unless the experience is unpleasant. |
| Liking | Groups working together bond | Common cause increases liking and friendship between group members and groups. |
| Liking | Groups in competition breeds enemies | Competition creates hostility and personal dislike. |
| Liking | Messages are attributed to messengers | When a message is unpleasant, the messenger is disliked, while good messages cause messengers to be liked. The attributes of the message are attributed to the messenger by association. |
| Liking | Association enhances liking or disliking | People are more receptive to compliance after a good meal. People associate to their nation, city, race, etc. and like it when the things they associate with succeed. |
| Liking | People tend to associate with things that enhance their self-image | If they like themselves, they choose to associate to things that are successful through the similarities to themselves. If they have a negative self-image they tend to associate with things that fail by seeking similarities with themselves. |

-continued

| Area | Technique | Explanation |
|---|---|---|
| Authority | Duty to authority is deeply embedded in culture | Higher authority overrides lower ones, appearance of authority replaced real authority, titles lead to the appearance of authority, higher deference to known authorities. |
| Authority | Appearances imply authority | Higher position appears to be taller, taller as more important, importance seen as larger, larger size implies more strength. clothing and accouterments imply authority (as a function of situation), other trappings imply authority. |
| Scarcity | Perceived scarcity increases perceived value | Similar to Shannon's information theory in which less frequently used syntax elements have higher information content. Scarce quantity, time, availability all make things more attractive. |
| Scarcity | Loss is higher value than gain | In trading a loss against an identical valued gain, the loss is more highly valued. |
| Scarcity | Desire to have what is restricted | Especially effective against teenagers and young children, but also quite effective against people of all ages. More effective if more restrictive. Exclusivity yield desire to have. |
| Scarcity | Desire to have it "our way" | Even if 'our way' is actually not 'our way', the fact of choice increases desirability. |
| Scarcity | Exclusive information is more valued | Secrets, information that others do not have, restricted information, all seem to make the information more valuable. Exclusive information about a shortage has more effect on driving up perceived value that the shortage itself. |
| Scarcity | Drops from abundance to scarcity increase value | More value is attributed to something if it is first possessed then lost. For example, revolutions are far more likely after some political gains followed by retrenchment. |
| Automaticity | automaticity can be enhanced | Increased rush, stress, uncertainty, indifference, distraction, and fatigue all lead to less thoughtful and more automatic responses. Thus by adding to these elements, we increase the effectiveness of all of these techniques. |

While Cialdini backs up this information with numerous studies, his work is largely done and largely cites western culture. Some of these elements are apparently culturally driven and care must be taken to assure that they are used in context. Similar studies for people interacting with and through computers have not been completed at this time as far as is known but they would clearly be helpful in understanding how people interact through and with computers.

Cialdini [8] provides a simple structure for influence and asserts that much of the effect of influence techniques is built-in and occurs below the conscious level for most people. His structure consists of reciprocation, contrast, authority, commitment and consistency, automaticity, social proof, liking, and scarcity. He cites a substantial series of psychological experiments that demonstrate quite clearly how people react to situations without a high level of reasoning and explains how this is both critical to being effective decision makers and results in exploitation through the use of compliance tactics. While Cialdini backs up this information with numerous studies, his work is largely based on and largely cites western culture. Some of these elements are apparently culturally driven and care must be taken to assure that they are used in context.

Charles Handy

Figure 5:
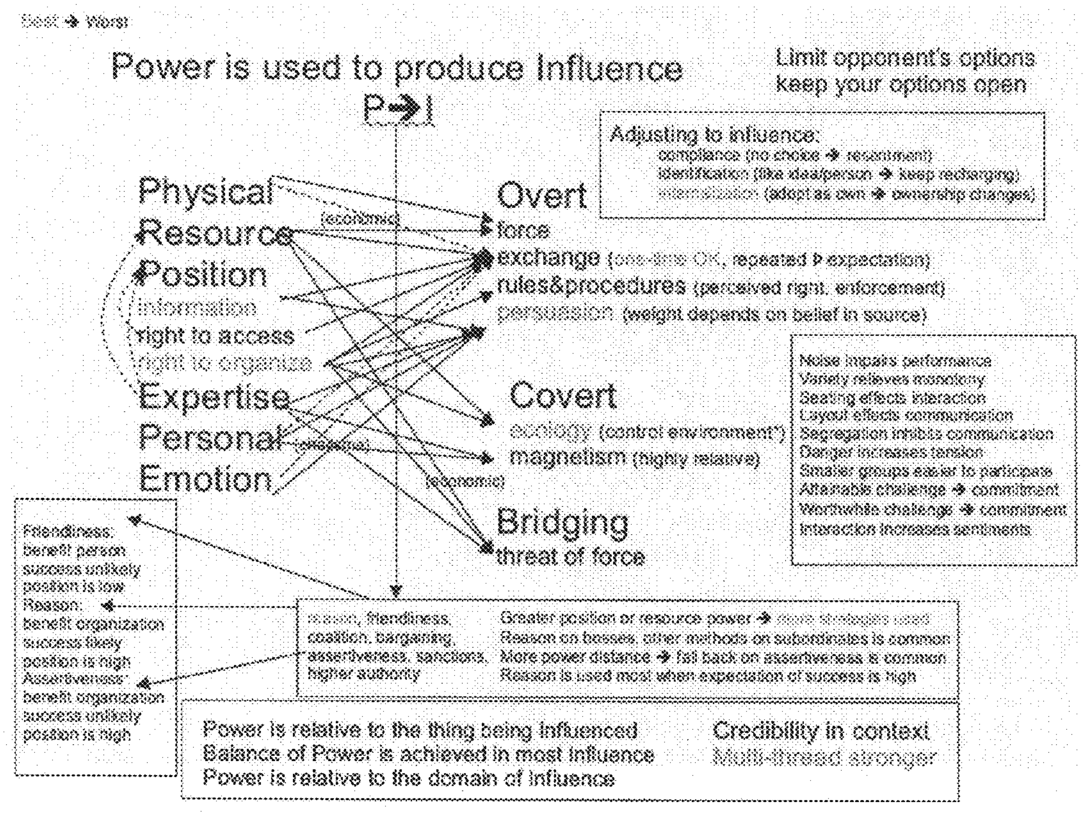
FIG. 5 is a chart illustrating a power and influence model that can be incorporated according to specific embodiments of the invention.

Charles Handy [10] discusses organizational structures and behaviors and the roles of power and influence within organizations. The National Research Council [11] discusses models of human and organizational behavior and how automation has been applied in this area. Handy models organizations in terms of their structure and the effects of power and influence. Influence mechanisms are described in terms of who can apply them in what circumstances. Power is derived from physicality, resources, position (which yields information, access, and right to organize), expertise, personal charisma, and emotion. FIG. 5 is a chart illustrating a power and influence model that can be incorporated according to specific embodiments of the invention. These result in influence through overt (force, exchange, rules and procedures, and persuasion), covert (ecology and magnetism), and bridging (threat of force) influences. Depending on the organizational structure and the relative positions of the participants, different aspects of power come into play and different techniques can be applied. The NRC report includes scores of examples of modeling techniques and details of simulation implementations based on those models and their applicability to current and future needs.

MKULTRA

Closely related to the subject of deception is the work done by the CIA on the MKULTRA project. [13] In June 1977, a set of MKULTRA documents were discovered, which had escaped destruction by the CIA. The Senate Select Committee on Intelligence held a hearing on Aug. 3, 1977 to question CIA officials on the newly-discovered documents.

The net effect of efforts to reveal information about this project was a set of released information on the use of sonic waves, electroshock, and other similar methods for altering peoples' perception. Included in this are such items as sound frequencies that make people fearful, sleepy, uncomfortable, and sexually aroused; results on hypnosis, truth drugs, psychic powers, and subliminal persuasion; LSD-related and other drug experiments on unwitting subjects; the CIA's "manual on trickery"; and so forth.

One 1955 MKULTRA document gives an indication of the size and range of the effort; the memo refers to the study of an assortment of mind-altering substances which would: (1) "promote illogical thinking and impulsiveness to the point where the recipient would be discredited in public", (2) "increase the efficiency of mentation and perception", (3) "prevent or counteract the intoxicating effect of alcohol" (4) "promote the intoxicating effect of alcohol", (5) "produce the signs and symptoms of recognized diseases in a reversible way so that they may be used for malingering, etc." (6) "render the indication of hypnosis easier or otherwise enhance its usefulness" (7) "enhance the ability of individuals to withstand privation, torture and coercion during interrogation and so-called 'brainwashing', (8) "produce amnesia for events preceding and during their use", (9) "produce shock and confusion over extended periods of time and capable of surreptitious use", (10) "produce physical disablement such as paralysis of the legs, acute anemia, etc.", (11) "produce 'pure' euphoria with no subsequent let-down", (12) "alter personality structure in such a way that the tendency of the recipient to become dependent upon another person is enhanced", (13) "cause mental confusion of such a type that the individual under its influence will find it difficult to maintain a fabrication under questioning", (14) "lower the ambition and general working efficiency of men when administered in undetectable amounts", and (15) "promote weakness or distortion of the eyesight or hearing faculties, preferably without permanent effects".

Greene

Greene [12] describes the 48 laws of power and, along the way, demonstrates 48 methods that exert compliance forces in an organization. These can be traced to cognitive influences and mapped out using models like Lambert's, Caldini's, and the model created for this effort.

| # | Saying | Content |
|---|---|---|
| Law 1 | Never outshine the master. | Always make those above you feel comfortable in their sense of superiority. In your desire to please or impress them do not go too far in displaying your talents or you might accomplish the opposite - inspire fear and insecurity. Make them appear more brilliant than they are - and you will attain the heights of power. |
| Law 2 | Never put too much trust in friends, learn how to use enemies. | Be wary of friends - they will betray you more quickly, for they are easily aroused to envy. They also become spoiled and tyrannical. But hire a former enemy and he will be more loyal than a friend, because he has more to prove. In fact you have more to fear from friends than from enemies. If you have no enemies, find a way to make them. |
| Law 3 | Conceal your intentions. | Keep people off balance and in the dark by never revealing the purpose behind your actions. Without a clue as to what you are up to, they cannot prepare a defense. Guide them far enough down the wrong path, envelop them in enough smoke, and by the time they realize your intentions, it will be too late. |
| Law 4 | Always say less than necessary. | When you are trying to impress people with words, the more you say, the more common you appear, and the less in control. Even if you're saying something banal, it will seem original if you make it vague, open-ended, and sphinx like. Powerful people impress and intimidate by saying less. The more you say, the more likely you are to say something foolish. |
| Law 5 | So much depends on reputation - guard it with your life. | Reputation is the cornerstone of power. Through reputation alone you can intimidate and win; once it slips, however, you are vulnerable, and will be attacked on all sides. Make your reputation unassailable. Always be alert to potential attacks and thwart them before they happen. Meanwhile, learn to destroy your enemies by opening holes in their own reputations. Then stand aside and let public opinion hang them. |
| Law 6 | Create an air of mystery. | Never make it too clear what you are doing or about to do. Do not show all your cards. Mystery and uncertainty create anticipation - everyone will want to know what comes next. Use mystery to beguile, seduce, even frighten. |
| Law 7 | Get others to do the work for you, but always take the credit. | Use the wisdom, knowledge, and legwork of other people to further your own cause. Not only will such assistance save you valuable time and energy, it will give you a godlike aura of efficiency and speed. In the end your helpers will be forgotten and you will be remembered. Never do yourself what others can do for you. |
| Law 8 | Make other people come to you - use bait if necessary. | When you force the other person to act, you are the one in control. It is always better to make your opponent come to you, abandoning his own plans in the process. Lure him with fabulous gains - then attack. You hold the cards |
| Law 9 | Win through your actions, never through argument. | Any momentary triumph you think you have gained through argument is really a Pyrrhic victory: the resentment and ill will you stir up is stronger and lasts longer than any momentary change of opinion. It is much more powerful to get others to agree with you through your actions, without saying a word. Demonstrate, do not explicate. |
| Law 10 | Infection: avoid the unhappy and unlucky. | You can die from someone else's misery - emotional states are as infectious as diseases. You may feel you are helping the drowning man but you are only precipitating your own disaster. The unfortunate sometimes draw misfortune on themselves; they will also draw it on you. Associate with the happy and fortunate instead. |
| Law 11 | Learn to keep people dependent on you. | To maintain your independence you must always be needed and wanted. The more you are relied on, the more freedom you have. Make people depend on you for their happiness and prosperity and you have nothing to fear. Never teach them enough so that they can do without you. |
| Law 12 | Use selective honesty and generosity to disarm your victim. | One sincere and honest move will cover over dozens of dishonest ones. Open-hearted gestures of honesty and generosity bring down the guard of even the most suspicious people. Once your selective honesty opens a hole in their armor, you can deceive and manipulate them at will. A timely gift - a Trojan horse - will serve the same purpose. |
| Law 13 | When asking for help, appeal to people's self-interest, never to their mercy or gratitude. | If you need to turn to an ally for help, do not bother to remind him of your past assistance and good deeds. He will find a way to ignore you. Instead, uncover something in your request, or in your alliance with him, that will benefit him, and emphasize it out of all proportion. He will respond enthusiastically when he sees something to be gained for himself. |
| Law 14 | Pose as a friend, work | Knowing about your rival is critical. Use spies to gather valuable information that will keep you a step ahead. Better still: play the spy yourself. In polite social encounters, learn to |

-continued

| # | Saying | Content |
|---|---|---|
| | as a spy. | probe. Ask indirect questions to get people to reveal their weaknesses and intentions. There is no occasion that is not an opportunity for artful spying. |
| Law 15 | Crush your enemy totally. | All great leaders since Moses have known that a feared enemy must be crushed completely. (Sometimes they have learned this the hard way.) If one ember is left alight, no matter how dimly it smolders, a fire will eventually break out. More is lost through stopping halfway than through total annihilation: the enemy will recover, and will seek revenge. Crush him, not only in body but in spirit. |
| Law 16 | Use absence to increase respect and honor. | Too much circulation makes the price go down: the more you are seen and heard from, the more common you appear. If you are already established in a group, temporary withdrawal from it will make you more talked about, even more admired. You must learn when to leave. Create value through scarcity. |
| Law 17 | Keep others in suspense: cultivate an air of unpredictability. | Humans are creatures of habit with an insatiable need to see familiarity in other people's actions. Your predictability gives them a sense of control. Turn the tables: be deliberately unpredictable. Behavior that seems to have no consistency or purpose will keep them off balance, and they will wear themselves out trying to explain your moves. Taken to an extreme, this strategy can intimidate and terrorize. |
| Law 18 | Do not build fortresses to protect yourself - isolation is dangerous. | The world is dangerous and enemies are everywhere - everyone has to protect themselves. A fortress seems the safest. But isolation exposes you to more dangers than it protects you from - it cuts you off from valuable information, it makes you conspicuous and an easy target. Better to circulate among people, find allies, mingle. You are shielded from your enemies by the crowd. |
| Law 19 | Know who you're dealing with - do not offend the wrong person. | There are many different kinds of people in the world, and you can never assume that everyone will react to your strategies in the same way. Deceive or outmaneuver some people and they will spend the rest of their lives seeking revenge. They are wolves in lambs' clothing. Choose your victims and opponents carefully, then - never offend or deceive the wrong person. |
| Law 20 | Do not commit to anyone do not commit to anyone. | It is the fool who always rushes to take sides. Do not commit to any side or cause but yourself. By maintaining your independence, you become the master of others - playing people against one another, making them pursue you. |
| Law 21 | Play a sucker to catch a sucker - seem dumber than your mark. | No one likes feeling stupider than the next person. The trick, then, is to make your victims feel smart - and not just smart, but smarter than you are. Once convinced of this, they will never suspect that you may have ulterior motives. |
| Law 22 | Use the surrender tactic: transform weakness into power. | When you are weaker, never fight for honor's sake; choose surrender instead. Surrender gives you time to recover, time to torment and irritate your conqueror, time to wait for his power to wane. Do not give him the satisfaction of fighting and defeating you - surrender first. By turning the other cheek you infuriate and unsettle him. Make surrender a tool of power. |
| Law 23 | Concentrate your forces. | Conserve your forces and energies by keeping them concentrated at their strongest point. You gain more by finding a rich mine and mining it deeper, than by flitting from one shallow mine to another - intensity defeats extensity every time. When looking for sources of power to elevate you, find the one key patron, the fat cow who will give you milk for a long time to come. |
| Law 24 | Play the perfect courtier. | The perfect courtier thrives in a world where everything revolves around power and political dexterity. He has mastered the art of indirection; he flatters, yields to superiors, and asserts power over others in the most oblique and graceful manner. Learn and apply the laws of courtiership and there will be no limit to how far you can rise in the court. |
| Law 25 | Re-create yourself. | Do not accept the roles that society foists on you. Re-create yourself by forging a new identity, one that commands attention and never bores the audience. Be the master of your own image rather than letting others define it for you. Incorporate dramatic devices into your public gestures and actions - your power will be enhanced and your character will seem larger than life. |
| Law 26 | Keep your hands clean. | You must seem a paragon of civility and efficiency: your hands are never soiled by mistakes and nasty deeds. Maintain such a spotless appearance by using others as unwitting pawns and screens to disguise your involvement. |
| Law 27 | Play on people's need to believe to create a cult like following. | People have an overwhelming desire to believe in something. Become the focal point of such desire by offering them a cause, a new faith to follow. Keep your words vague but full of promise; emphasize enthusiasm over rationality and clear thinking. Give your new disciples rituals to perform, ask them to make sacrifices on your behalf. In the absence of organized religion and grand causes, your new belief system will bring you untold power. |
| Law 28 | Enter action with boldness. | If you are unsure of a course of action, do not attempt it. Your doubts and hesitations will infect your execution. Timidity is dangerous: better to enter with boldness. Any mistakes you commit through audacity are easily corrected with more audacity. Everyone admires the bold; no one honors the timid. |
| Law 29 | Plan all the way to the end. | The ending is everything. Plan all the way to it, taking into account all the possible consequences, obstacles, and twists of fortune that might reverse your hard work and give the glory to others. By planning to the end you will not be overwhelmed by circumstances and you will know when to stop. Gently guide fortune and help determine the future by thinking far ahead. |

-continued

| # | Saying | Content |
|---|---|---|
| Law 30 | Make your accomplishments seem effortless. | Your actions must seem natural and executed with ease. All the toil and practice that go into them, and also all the clever tricks, must be concealed. When you act, act effortlessly, as if you could do much more. Avoid the temptation of revealing how hard you work - it only raises questions. Teach no one your tricks or they will be used against you. |
| Law 31 | Control the options: get others to play with the cards you deal. | The best deceptions are the ones that seem to give the other person a choice: your victims feel they are in control, but are actually your puppets. Give people options that come out in your favor whichever one they choose. Force them to make choices between the lesser of two evils, both of which serve your purpose. Put them on the horns of a dilemma: they are gored wherever they turn. |
| Law 32 | Play to people's fantasies. | The truth is often avoided because it is ugly and unpleasant. Never appeal to truth and reality unless you are prepared for the anger that comes from disenchantment. Life is so harsh and distressing, that people who can manufacture romance or conjure up fantasy are like oases in the desert: everyone flocks to them. There is great power in tapping into the fantasies of the masses. |
| Law 33 | Discover each man's thumbscrew. | Everyone has a weakness, a gap in the castle wall. That weakness is usually an insecurity, an uncontrollable emotion or need; it can also be a small secret pleasure. Either way, once found, it is a thumbscrew you can turn to your advantage. |
| Law 34 | Be royal in your own fashion: act like a king to be treated like one. | The way you carry yourself will often determine how you are treated: in the long run, appearing vulgar or common will make people disrespect you. For a king respects himself, and inspires the same sentiment in others. By acting regally and confident of your powers, you make yourself seem destined to wear a crown. |
| Law 35 | Master the art of timing. | Never seem to be in a hurry - hurrying betrays a lack of control over yourself, and over time. Always seem patient, as if you know that everything will come to you eventually. Become a detective of the right moment; sniff out the spirit of the times, the trends that will carry you to power. Learn to stand back when the time is not yet ripe, and to strike fiercely when it has reached fruition. |
| Law 36 | Disdain things you cannot have: ignoring them is the best revenge. | By acknowledging a petty problem you give it existence and credibility. The more attention you pay an enemy, the stronger you make him; and a small mistake is often made worse and more visible when you try to fix it. It is sometimes best to leave things alone. If there is something you want but cannot have, show contempt for it. The less interest you reveal, the more superior you seem. |
| Law 37 | Create compelling spectacles. | Striking imagery and grand symbolic gestures create the aura of power - everyone responds to them. Stage spectacles for those around you, then, full of arresting visuals and radiant symbols that heighten your presence. Dazzled by appearances, no one will notice what you are really doing. |
| Law 38 | Think as you like but behave like others. | If you make a show of going against the times, flaunting your unconventional ideas and unorthodox ways, people will think that you only want attention and that you look down upon them. They will find a way to punish you for making them feel inferior. It is far safer to blend in and nurture the common touch. Share your originality only with tolerant friends and those who are sure to appreciate your uniqueness. |
| Law 39 | Stir up waters to catch fish. | Anger and emotion are strategically counterproductive. You must always stay calm and objective. But if you can make your enemies angry while staying calm yourself, you gain a decided advantage. Put your enemies off-balance: find the chink in their vanity through which you can rattle them and you hold the strings. |
| Law 40 | Despise the free lunch. | What is offered for free is dangerous - it usually involves either a trick or a hidden obligation. What has worth is worth paying for. By paying your own way you stay clear of gratitude, guilt, and deceit. It is also often wise to pay the full price - there is no cutting corners with excellence. Be lavish with your money and keep it circulating, for generosity is a sign and a magnet for power. |
| Law 41 | Avoid stepping into a great man's shoes. | What happens first always appears better and more original than what comes after. If you succeed a great man or have a famous parent, you will have to accomplish double their achievements to outshine them. Do not get lost in their shadow, or stuck in a past not of your own making: establish your own name and identity by changing course. Slay the overbearing father, disparage his legacy, and gain power by shining in your own way. |
| Law 42 | Strike the shepherd and the sheep will scatter. | Trouble can often be traced to a single strong individual - the stirrer, the arrogant underling, the poisoner of good will. If you allow such people room to operate, others will succumb to their influence. Do not wait for the troubles they cause to multiply, do not try to negotiate with them - they are irredeemable. Neutralize their influence by isolating or banishing them. Strike at the source of the trouble and the sheep will scatter. |
| Law 43 | Work on the hearts and minds of others. | Coercion creates a reaction that will eventually work against you. You must seduce others into wanting to move in your direction. A person you have seduced becomes your loyal pawn. And the way to seduce others is to operate on their individual psychologies and weaknesses. Soften up the resistant by working on their emotions, playing on what they hold dear and what they fear. Ignore the hearts and minds of others and they will grow to hate you. |
| Law 44 | Disarm and infuriate with the mirror effect. | The mirror reflects reality, but it is also the perfect tool for deception: when you mirror your enemies, doing exactly as they do, they cannot figure out your strategy. The Mirror Effect mocks and humiliates them, making them overreact. By holding up a mirror to their psyches, you seduce them with the illusion that you share their values; by holding up a mirror to their actions, you teach them a lesson. Few can resist the power of the Mirror Effect. |
| Law 45 | Preach the need for change, but never reform | Everyone understands the need for change in the abstract, but on the day-to-day level people are creatures of habit. Too much innovation is traumatic, and will lead to revolt. If you are new to a position of power, or an outsider trying to build a power base, make a show of respecting the old way of doing things. If change is necessary, make it feel like a gentle |

-continued

| # | Saying | Content |
|---|---|---|
| | too much at once. | improvement on the past. |
| Law 46 | Never appear too perfect. | Appearing better than others is always dangerous, but most dangerous of all is to appear to have no faults or weaknesses. Envy creates silent enemies. It is smart to occasionally display defects, and admit to harmless vices, in order to deflect envy and appear more human and approachable. Only gods and the dead can seem perfect with impunity. |
| Law 47 | Do not go past the mark you aimed for; in victory, learn when to stop. | The moment of victory is often the moment of greatest peril. In the heat of victory, arrogance and overconfidence can push you past the goal you had aimed for, and by going too far, you make more enemies than you defeat. Do not allow success to go to your head. There is no substitute for strategy and careful planning. Set a goal, and when you reach it, stop. |
| Law 48 | Assume formlessness. | By taking a shape, by having a visible plan, you open yourself to attack. Instead of taking a form for your enemy to grasp, keep yourself adaptable and on the move. Accept the fact that nothing is certain and no law is fixed. The best way to protect yourself is to be as fluid and formless as water; never bet on stability or lasting order. Everything changes. |

REFERENCES

[1] Chuck Whitlock, "Scam School", MacMillan, 1997.

[2] Fay Faron, "Rip-Off: a writer's guide to crimes of deception", Writers Digest Books, 1998, Cinn, Ohio.

[3] Bob Fellows, "Easily Fooled", Mind Matters, PO Box 16557, Minneapolis, Minn. 55416, 2000

[4] Thomas Gilovich, "How We Know What Isn't So: The fallibility of human reason in everyday life", Free Press, NY, 1991

[5] Charles K. West, "The Social and Psychological Distortion of Information", Nelson-Hall, Chicago, 1981.

[6] Al Seckel, "The Art of Optical Illusions", Carlton Books, 2000.

[7] Chester R. Karrass, "The Negotiating Game", Thomas A. Crowell, New York, 1970.

[8] Robert B. Cialdini, "Influence: Science and Practice", Allyn and Bacon, Boston, 2001.

[9] Richard J. Robertson and William T. Powers, Editors, "Introduction to Modern Psychology, The Control-Theory View". The Control Systems Group, Inc., Gravel Switch, Ky., 1990.

[10] Charles Handy, "Understanding Organizations", Oxford University Press, NY, 1993. img35.jpg

[11] National Research Council, "Modeling Human and Organizational Behavior", National Academy Press, Washington, D.C., 1998.

[12] Robert Greene, "The 48 Laws of Power", Penguin Books, New York 1998

[13] Various documents, A list of documents related to MKULTRA can be found over the Internet.

Systems and Methods of the Invention

Even with the summary of relevant research and findings given above, the problem remains for an interested reader how to incorporate all or a subset of these, or similar studies, into simulated or real-world applications. The present invention, in specific embodiments, involves crafting a rule-set and data analysis method for applying these studies to real world problems. This aspect of the invention can be embodied in one or more logic processes running on a computer system, or in a kit or set of graphical and textual materials that provide users with advice and other results based on inputs related to situations and actors.

The present invention will be further understood with reference to FIG. 1 and further with reference to the Appendix. It will be understood that these examples are not intended to illustrate every possible data interface screen that may be desirable in a system according to specific embodiments of the invention, and that more generic and commonly understood interfaces, such as for file saving or report printing, are not shown. It will be further understood that not all details shown in any screen shot are necessary elements of all embodiments of the invention.

FIG. 1 illustrates a screenshot of an example graphical interface with interactive actor objects and data input and advice presentation and data output fields allowing influence related data to be input and presented interactively according to specific embodiments of the present invention. Such a graphical interface, according to specific embodiments of the invention provides users an interactive and intuitive way to navigate through various data input tasks and options and view advice and strategies that are selected from possibly a large amount of stored data regarding influence methods. The juxtaposition of a graphical representation of actors and their relationships to a situation allows users to interpret input data and its effects on advice presented with some ease.

Collecting Data Provided about a Situation

In general, the present invention uses data collected about actors and/or situations to provide advice regarding influence strategies. According to specific embodiments, as illustrated in FIG. 1, the invention involves a method and/or modules that accept input from and/or produce output to a graphical user interface which depicts individuals or groups as located in a two dimensional space indicative of their support and interest in the issue at hand at the time of interest.

Data entry in this embodiment indicates the position, charisma, money, expertise, force, friendliness, and adoption characteristics of each individual or group (represent by the named boxes) which is combined with the location in the space to provide a variety of indicators of the situation at present and how it can be altered by actions. Output consisting of colors, numbers, listings of elements of advice, and other relevant information and factors are provided and updated as the user alters information about the individual or group or moves that individual or group around the screen to indicate a different location in the two dimensions identified.

One example method that can be used in this embodiment includes the use of a series of indicators that identify options that are available for use as indicated by the analysis of Handy [10] and the National Research Council [11].

As an example, based on the position or title of a user relative to the position or title of an actor that is the subject of potential influence as entered through the data entry process, a determination per the "Power produces influence" chart is made as to which forms of overt, covert, and bridging influence are available to be applied. This list is then presented as a set of options.

Potential threats to action (in this particular depiction no threats are identified) are generated based on the combination of opposition and relative power level as well, so that the influences that an actor can have on a user and that are potentially serious enough to warrant being called threats are derived using the same basic mechanisms as used to identify influence methods.

In this example, the criticality of the situation is based on adoption phase and friendliness, and potential mechanisms of action, for example, as discussed in Cialdini [8], Karrass [7], and others are used to generate information that limits the strategies that can be used. For example, social proof is used as a strategy in suggesting that a project that others have already adopted should be presented to someone who normally adopts projects at the current phase. This is weighted by the result that social proof works better for those who like the person communicating it to them.

Other related research and expert opinions are also used to impact the advice provided. For example, if a target of influence that has historically been receptive to ideas has become hardened against the particular issues at hand, and if they normally adopt new ideas early but their adoption of this one is later than usual, then this is more important as an issue to address than a condition in which an individual or group that historically adopts an idea later than others and has a historic dislike for those undertaking to create the influences who is opposed to the idea early in its introduction.

The example embodiment illustrated in FIG. 1 selects from among the set of viable options and uses a metric based on these results and expert interviews to determine which of the potential sets of advice are most effective in the current situation. It then provides specific advice in descriptive form at the bottom of the screen selected and composed from among a set of built-in sentence fragments associated with different conditions.

This example embodiment also provides scoring information on how much overall effect movement of this actor (individual or group) through the space will have on the overall metric provided for assessing the current likelihood of project success. This is done by rating some of the input elements and derived values according to a common scale, in this case 1 through 5, and multiplying each by a factor that associates the relative weight of that factor in influencing change in the particular organization being influenced. The combined weights are then normalized relative to the maximum possible total weight to give a measurement of the relative import of movements of this individual or group in the space. Analysis of differences for movements in different directions and movements of different individuals and groups are then used to determine the most efficient ordering of which individual in which direction for improving the overall total rating of the situation and the overall total current rating of the situation is displayed relative to a maximum rating of 100. This particular embodiment also provides comment information putting this data into linguistic terms.

This embodiment further optionally provides for a file name that is used to store and subsequently retrieve the current situation for future use and the capacity to store, retrieve, and analyze, and present results for an unlimited number of these situations.

This particular embodiment also provides a capacity to alter values and locations of individuals and groups through the user interface, and to create or delete individuals or groups for analysis.

This particular embodiment also provides output in written form that consolidates all actions advices for all individuals and groups and sorts those results from most important to least important according to the metrics used to determine effects of movement in the space.

The present invention can be implemented as a computer program running on an information appliance, such as a computer, or on several computers using a network. The invention may also be embodied in other forms such as a board game using tables and charts to judge player moves and dice or similar random selection methods to cause results of efforts to be generated for the situation. In one embodiment, a network may include connections via the Internet, a Local Area Network, subscriber networks, etc. Among other possible user interfaces, the invention may be embodied in a system of GUIs. General methods for construction and operation of such systems is well known in the art, and the present invention can be understood as operating in a way roughly similar to other systems used in similar environments, except as specified herein.

A specific example embodiment is presented in the Source Code Appendix, which presents a logic module system, written in PERL, for creating the interactive graphical display as shown in FIG. 1, for evaluating inputs, and for providing advice and other options and functionality as described herein.

The present invention can also be implemented using a series of charts, tables, cards, etc., that systematize a set of rules related to influence and provide advice and/or scoring related to strategies for one or more users. Such an implementation may be particularly suited to embodiments in various strategy games for educational or entertainment.

Embodiment in a Programmed Digital Apparatus

The invention may be embodied in a fixed media or transmissible program component containing logic instructions and/or data that when loaded into an appropriately configured computing device cause that device to perform in accordance with the invention.

As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a viewer accesses through a communication medium in order to download a program component.

Figure 2:
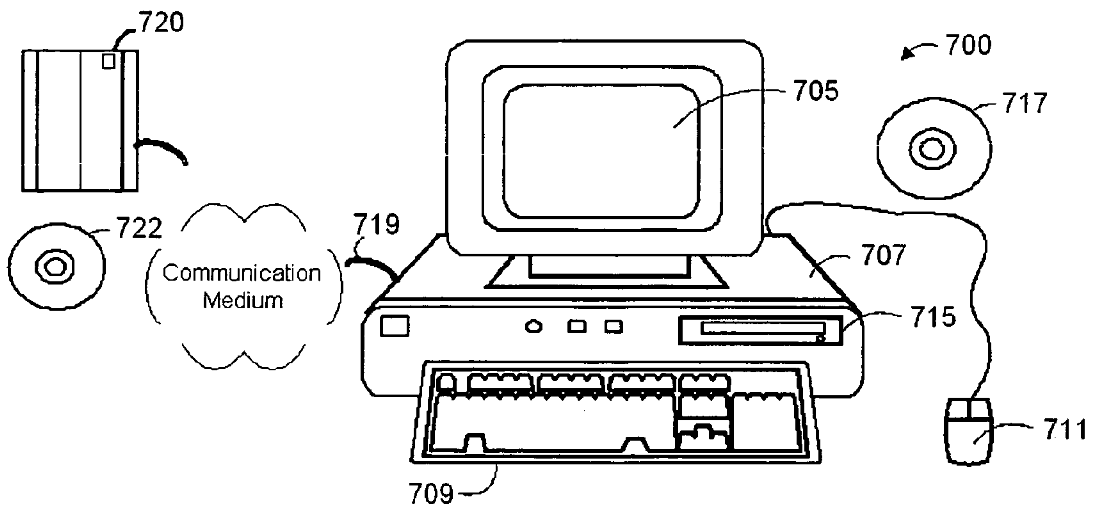
FIG. 2 illustrates a representative example logic device in which various aspects of the present invention may be embodied or that can be used to provide interface to a system according to the invention.

FIG. 2 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language that may be used to create an ASIC or PLD that operates as herein described.

Example Embodiment as a Kit or Board Game

Figure 3A:
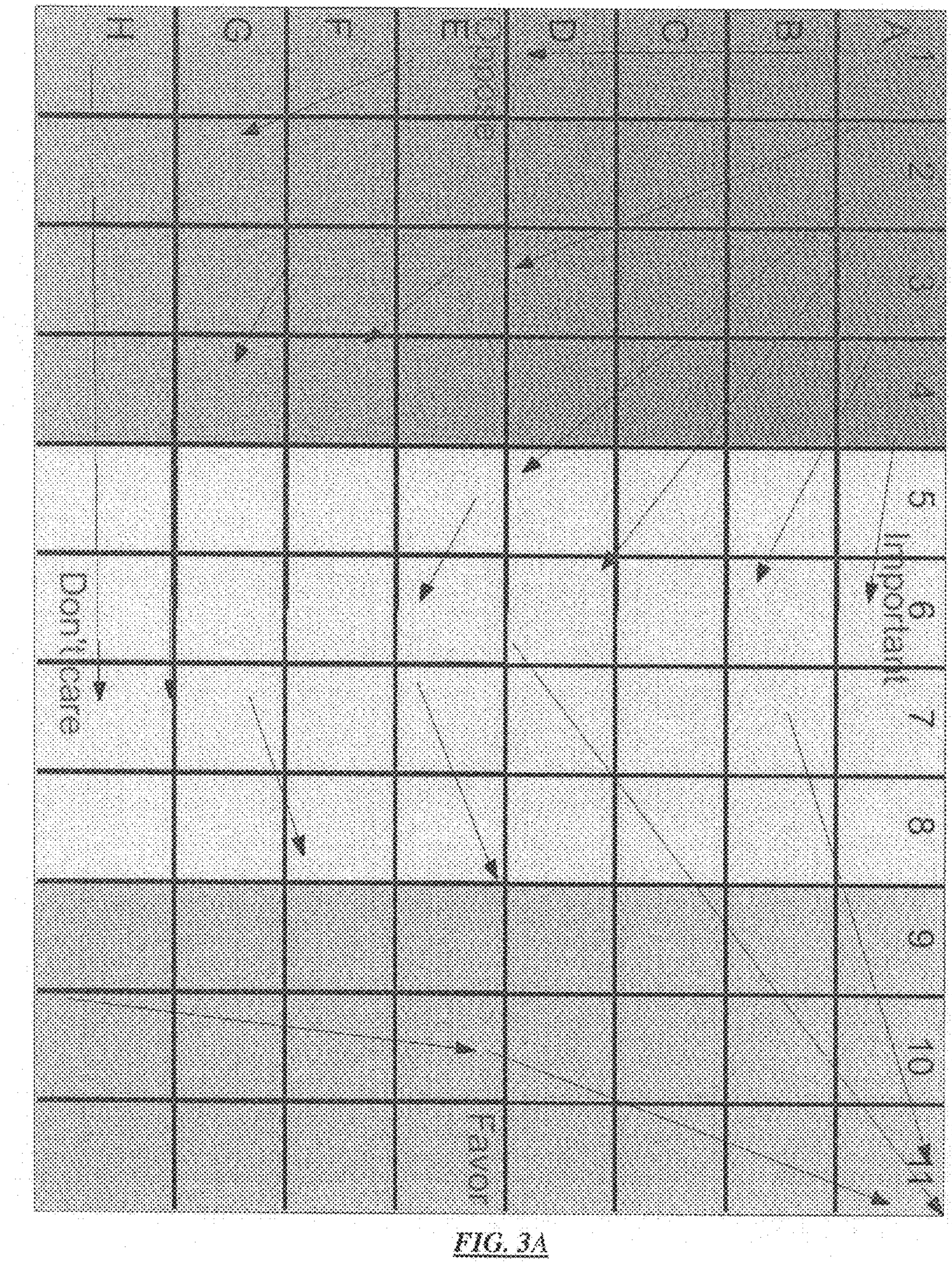
FIG. 3 illustrates an example of board game or kit according to specific embodiments of the invention.

FIG. 3 illustrate example of board game or kit embodiments of the invention in which labeled squares are used to place pieces representing different individuals or groups to be influenced within the overall situation. Players indicate their selection of a strategy for an individual piece on the board and look up their proposed move in a large table for example as provided in a game scoring booklet. Using the row (A . . . H) and column (1 . . . 11) and information set onto the game pieces, players can compare their selection of techniques to the table to get a score for the move. Players keep track of their scores on a score sheet trying to outscore their opponents in gaining influence. FIG. 4 illustrates an example of a score table according to specific embodiments of the invention.

For example, of a token indicating the CEO is in square G6, and the player selects a strategy consisting of "ignore the CEO" for now as a move, the player then looks up the move for the CEO in that square and based on their selection, gets a score as indicated in the game scoring booklet. In this case, as an example, but not necessarily indicating the actual score, the player might get a 6 out of 10 as their score for that move. They then add 6 to their current score to get their new score and the next player makes their move. The game ends when all of the players decide not to move any more, or when a player reaches a certain number of points, perhaps 100 for this scoring system. In this embodiment, individual scores for moves can range from −10 to 10 and are based on the same information contained in the software embodiment identified herein.

Example Game instructions

As a further example, a game or simulation kit as depicted herein can proceed as follows:

1) Place pieces as depicted at random over the board.
2) Use a score card with one column per player, each playing having an initial score of 0 points.
3) Each player in turn selects one game piece on the board that they have not selected for a particular number of turns (e.g., 5) and the player chooses a move from the move table associated with that game piece.
4) A referee looks up the move in the Game Score Booklet for that game piece at that location on the board and tells the player their score for this move, which is then added to their current score for a new total score.
5) The selected game piece placed at random face up over the board (for example by being tossed in the air over the game board) in preparation for the next move.
6) The game continues from player to player until an end point is reached, such as a player gets to a total score of −50 or +50.
7) The final score of each player indicates their relative rankings for the game with the highest score being the best score.
8) For fun or tournaments, scores are recorded game after game and players are ranked by their average scores.

Other Embodiments

The invention has now been described with reference to specific embodiments. Other embodiments will be apparent to those of skill in the art. In particular, a user digital information appliance has generally been illustrated or described as a personal computer. However, the digital computing device is meant to be any device for handling information could include such devices as a digitally enabled television, cell phone, personal digital assistant, etc.

It is understood that the examples and embodiments described herein are for illustrative purposes only and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed:

1. A computer system that is operable for automatically recommending influence actions to a user comprising:

a processor;

an interface for receiving situation data regarding a situation and a desired outcome;

an interface for receiving actor data regarding one or more human actors that have a relationship to said situation;

wherein said actor data comprises, for one or more of said human actors, a favorability value indicating favorability of an actor to said desired outcome;

wherein said actor data comprises, for one or more of said human actors, an importance value indicating importance an actor holds towards said situation or said desired outcome;

wherein said importance value and said favorability value define a two-dimensional space;

wherein data indicators representing said one or more human actors are placed in said two-dimensional space according to favorability values and importance values for said actors;

a data store for storing data regarding said situation and said plurality of human actors;

a predetermined recommendations database comprising a predetermined set of influence actions applicable to one or more of said actors, said influence actions each directed to adjusting importance or favorability of one or more of said actors towards said desired outcome;

a rule set analysis module using said situation data and said actor data to select influence actions applicable to actors from said predetermined recommendations database, said rule set analysis module using said importance value and said favorability value of an actor for selecting a recommended influence action for that actor;

and;

a presentation interface for presenting, to said user, one or more recommended influence actions applicable to one or more of said actors.

2. The system of claim 1 wherein said actor data further comprises one or more characteristics selected from the group consisting of:

identities;

position within an organization;

job title;

amounts of funds or other resources available;

charisma;

physical power either directly or indirectly available;

personal or available expertise;

typical adoption cycles for new ideas;

opposition or favoritism with respect to other actors;

family, caste, clan, tribe, or other group or identify affiliation;

history with respect to any portion of some or all of these factors; and other information about an actor.

3. The system of claim 1 wherein said situation data is selected from the group consisting of:

a current state of a situation about which information is entered, and communications and other related plans and plan states relative to the situation about which information is entered or provided; and wherein said influence strategies comprise: (1) controlling an actor's access to information; (2) ignoring an actor; (3) maintaining an actor's support through friendliness, flattery, or other means; (4) gaining support of an actor by providing them information;

further wherein said influence strategies further comprise: (5) forming an alliance with an actor; (6) keeping an actor's support using reason, friendliness, or persuasion; (7) asking an actor for funding as a leader; (8) asking an actor to advocate for the your position as an expert; (9) supporting an actor's efforts as an ally; (10) engage an actor in evaluation and design; (11) keeping an actor informed; (12) engaging an actor elsewhere.

4. The system of claim 1 further wherein:

said system using said recommendations in order to alter measured qualities or quantities derived from or related to the situation; and further wherein said influence actions comprise actions from the general categories: (1) influencing an actor's position with respect to a situation; (2) influencing an actor with financial means; (3) influencing an actor using charisma; (4) influencing an actor using expertise.

5. The system of claim 1 further wherein:

said rule set analysis module contains influence actions and analysis logic derived from influence research.

6. The system of claim 1 further comprising:

a long term data store for storing data about a situation and the current state of relevant actors for later retrieval and simulation.

7. The system of claim 1 further comprising:

a means for input data to be modified and results recomputed to reflect changing real, perceived, or proposed situations.

8. The system of claim 1 further comprising:

combining measures of outcomes and other results with original data so as to produce additional indications.

9. The system according to claim 1 wherein results of historic and ongoing research into power and influence strategies and tactics are applied in order to generate said recommendations.

10. The system according to claim 1 wherein said actor data and said recommendations are graphically presented in colors, numbers, words, locations, sentences, shapes, or others visual means so as to recommendations regarding actors to a user.

11. The system according to claim 1 further comprising:

employing hidden information regarding at least one actor with results compared to historic, generated, or other individual or group results in order to produce scores of the strategies, tactics, or other identified specifications of those individuals relative to calculating devices and/or other individuals and/or other groups.

12. The system according to claim 1 further comprising:

a data store for saving scores of users;

using said scores as a basis for changing stored information about the performance of users on these strategies, tactics, and techniques and in which the stored information is used to rank those users relative to each other.

13. The system according to claim 1 further wherein:

said rule set analysis module associating a weight to one or more types of situation and actor data elements;

said rule set analysis module associating a numerical value to one or more individual instances of said situation and actor data elements; and said rule set analysis module using a combination of said weights and said numerical values to select said recommendations.

14. The system according to claim 1 further comprising:

computing derived values from input data;

using said derived values in combination with said input data to select from a predefined set of strategies or tactics according to a table or other computational method that provides the same results as such a table.

15. The system according to claim 1 further comprising:

assigning default values for said actor data and said situation data where those values are not entered by a user, said default values used as assumptions in said analysis module.

16. The system according to claim 1 in which the generated values are used according to a predefined criteria so as to generate situations with specific characteristics so that they map to realistic situations likely to be found in realistic environments or other situations corresponding to specific constraints used to optimize against other criteria such as educational value, interest, or enjoyment.

17. The system according to claim 1 in which results are partially or fully ordered, sorted, or otherwise ranked according to a scoring system.

18. The system according to claim 1 wherein users or players engage in a game using moves in order to compete or cooperate with other users or players so as to cause simulated situational changes which change the scores of one or more of those users or players or situations.

19. The system according to claim 1 further comprising:

an interactive graphical user interface, said interface comprising:

a plurality of graphical objects indicating actors;

a plurality of input fields allowing input of data regarding a situation;

a plurality of output fields for display data relating to said advice or strategies.

20. An electronic data file, recorded or transmitted on a tangible medium, that when loaded into an appropriately configured digital apparatus causes the apparatus to embody the system of claim 1.

21. A computer implemented method operable for automatically recommending influence actions to a user comprising:

a computer performing the steps of:

receiving situation data regarding a situation and a desired outcome;

receiving actor data regarding one or more human actors that have a relationship to said situation;

wherein said actor data comprises, for one or more of said human actors, a favorability value indicating favorability of an actor to said desired outcome;

wherein said actor data comprises, for one or more of said human actors, an importance value indicating importance an actor holds towards said situation or said desired outcome;

wherein said importance value and said favorability value define a two-dimensional space;

placing data indicators representing said one or more human actors in said two-dimensional space according to favorability values and importance values for said actors;

storing data regarding said situation and said plurality of human actors;

using said situation data said importance values and said favorability values to select influence actions applicable to actors from a predetermined recommendations database by applying a rule set to said values;

said predetermined recommendations database comprising a predetermined set of influence actions applicable to one or more of said actors, said influence actions each directed to adjusting importance or favorability of one or more of said actors towards said desired outcome;

presenting, to said user, one or more recommended influence actions applicable to one or more of said actors.

22. The computer implemented method of claim 21 further comprising:

calculating metrics for said rule set using an apparatus selected from the group consisting of:

an automated calculating device;

a set of tables; and other readily usable mechanical, electrical, optical, or other similar mechanism to allow rapid application of these techniques for individuals or groups of people.

23. The computer implemented method of claim 21 further comprising:

using a generator for one or more situation or actor data values selected from the group: dice, a deck of cards, an automated pseudo-random or truly random number generator, coins or other flappable indicators;

wherein said generator creates situations not in correspondence to any specific real situation for simulation, educational, or entertainment purposes.

24. The computer implemented method of claim 21 further comprising:

using a computer system for inputting of data and selecting and presenting recommendations according to said rule set.

25. The computer implemented method of claim 21 further comprising:

inputting data and provision of advise is accomplished using one or more of:

booklets;

tables;

cards;

or any other mechanical or printed material known for presenting data values and/or presenting data value results of various operations.

* * * * *